United States Patent
Avetisian et al.

[11] Patent Number: 5,720,854
[45] Date of Patent: Feb. 24, 1998

[54] PURGE FEEDING MEANS AND METHOD

[75] Inventors: Vahan Avetisian, Burbank; Constantin Bugescu, La Habra Heights; Craig Joseph Castagnoli, Rowland Heights, all of Calif.; Suk-Bae Cha, Denver, Colo.

[73] Assignee: Texaco Inc., White Plains, N.Y.

[21] Appl. No.: 637,692

[22] PCT Filed: Oct. 27, 1994

[86] PCT No.: PCT/US94/12312

§ 371 Date: Apr. 25, 1996

§ 102(e) Date: Apr. 25, 1996

[87] PCT Pub. No.: WO95/12103

PCT Pub. Date: May 4, 1995

Related U.S. Application Data

[63] Continuation of Ser. No. 142,020, Oct. 28, 1993, Pat. No. 5,433,018.

[51] Int. Cl.$^6$ .............................. F23K 3/00; C10B 47/18
[52] U.S. Cl. ..................... 201/3; 201/25; 202/118; 585/241
[58] Field of Search ............... 585/241; 423/460; 34/182; 202/118, 218; 201/3, 25

[56] References Cited

U.S. PATENT DOCUMENTS

| | | | |
|---|---|---|---|
| 4,250,158 | 2/1981 | Solbakken et al. | 585/241 |
| 4,255,129 | 3/1981 | Reed et al. | 432/13 |
| 4,454,427 | 6/1984 | Sosnowski | 290/2 |
| 4,686,008 | 8/1987 | Gibson | 585/241 |
| 4,889,556 | 12/1989 | Dighe | 75/10.22 |
| 4,900,401 | 2/1990 | Horton | 202/117 |
| 5,127,588 | 7/1992 | Schmidt | 241/97 |
| 5,129,995 | 7/1992 | Agarwal | 201/21 |
| 5,157,176 | 10/1992 | Munger | 585/241 |
| 5,198,018 | 3/1993 | Agarwal | 75/401 |
| 5,257,586 | 11/1993 | Davenport | 110/246 |
| 5,389,691 | 2/1995 | Cha et al. | 521/41 |
| 5,423,950 | 6/1995 | Avetisian et al. | 201/3 |
| 5,430,207 | 7/1995 | Keck | 585/241 |
| 5,433,018 | 7/1995 | Avetisian et al. | 34/182 |
| 5,464,503 | 11/1995 | Avetisian et al. | 201/3 |

*Primary Examiner*—Cynthia L. Nessler
*Attorney, Agent, or Firm*—Rodman & Rodman

[57] ABSTRACT

A purge chamber for purging oxygen from interlocking, solid material, such as shredded tire pieces, prior to further processing of the material in a liquefaction apparatus. The purge chamber includes a chamber for holding interlocking, solid material. An entrance port is connected to the chamber for passing the interlocking, solid material into the chamber. A purge device communicates with the chamber for providing a purging gas to the chamber. An exit port of the chamber passes the interlocking, solid material from the chamber. An auger screw mounted in the chamber, when rotated, moves the interlocking, solid material from within the chamber into the exit port.

12 Claims, 2 Drawing Sheets

PURGE FEEDING MEANS AND METHOD

This application is a 371 of PCT/US94/12312, filed Oct. 27, 1994, which is continuation of application Ser. No. 08/142,020 filed Oct. 28, 1993, now U.S. Pat. No. 5,433,018.

BACKGROUND OF THE INVENTION

Field of the Invention

The present invention relates to means and method for feeding interlocking solid material to process apparatus and, more particularly, to means and method for feeding shredded tires to a tire liquefaction process apparatus.

SUMMARY OF THE INVENTION

The present invention is a purge chamber which includes a chamber for holding interlocking solid material. An entrance port apparatus passes the interlocking solid material into the chamber where it is purged by a purging gas. An exit port apparatus passes the solid interlocking solid material from the chamber. Located within the chamber is moving apparatus which moved the interlocking solid material from the chamber through the exit port apparatus. Further, located within the chamber, is yet another apparatus which prevents the binding of the interlocking solid material.

The objectives and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purpose and are not to be construed as defining the limits of the invention.

DESCRIPTION OF THE INVENTION

Figure 1:
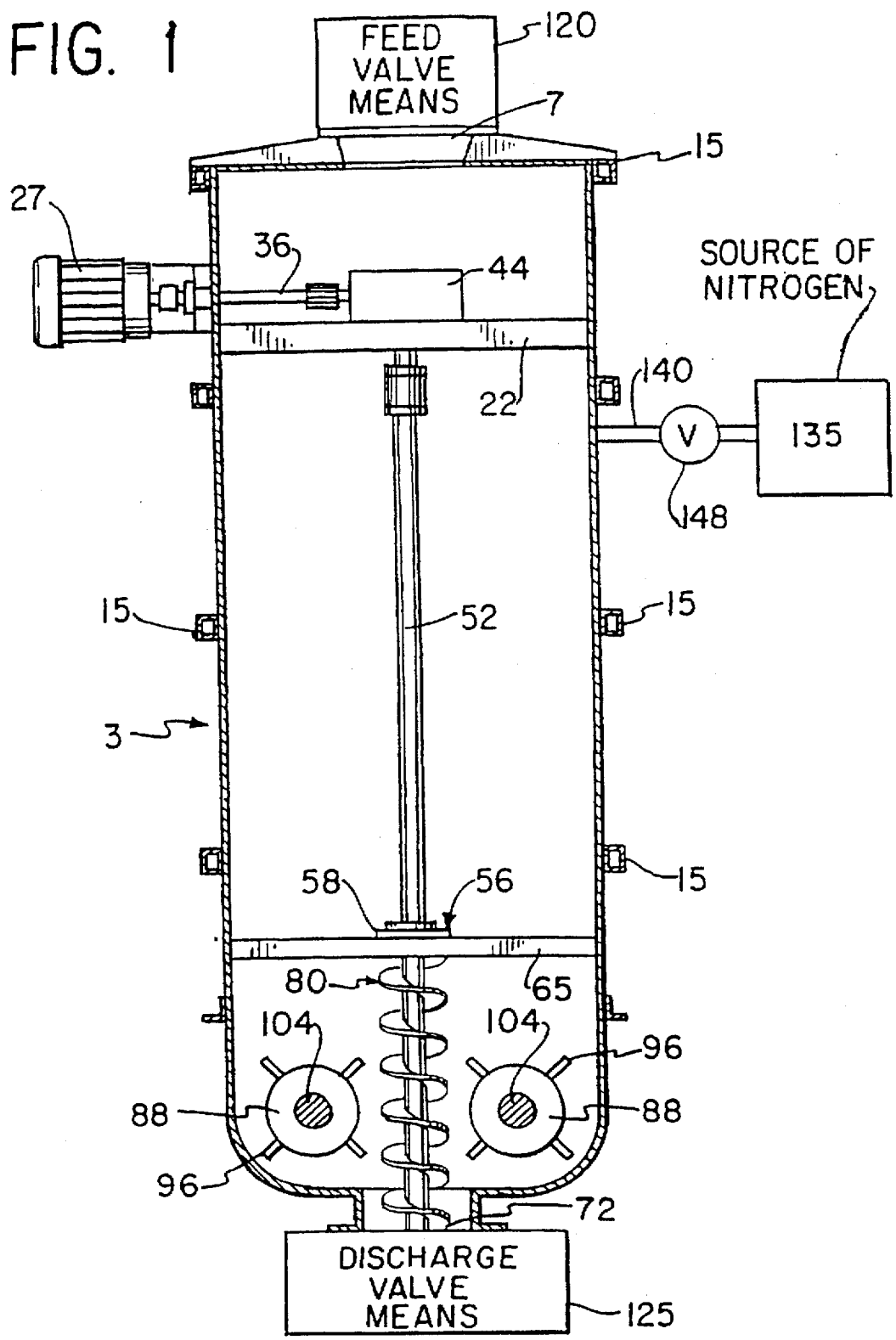
FIG. 1 is a graphical representation of apparatus, constructed in accordance with the present invention, for the purge feeding of interlocking solid material to process apparatus.
Figure 2:
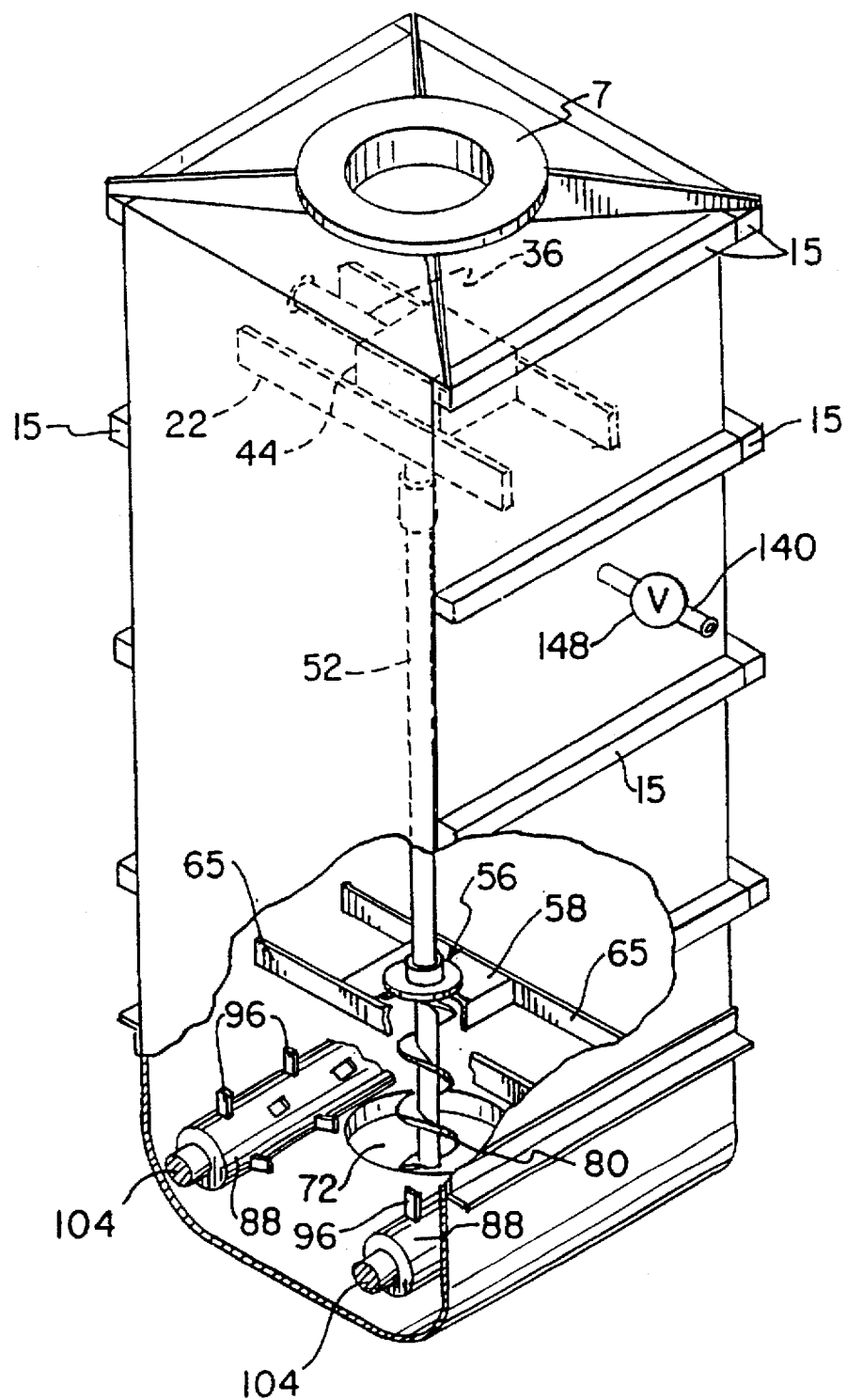
FIG. 2 is an isometric view of the chamber shown in FIG. 1.

Referring to FIGS. 1 and 2, there is shown apparatus for the purging of interlocking solid materials in a sealed chamber. The phrase "interlocking solid material" refers to solid substances that, because of their shape and/or composition, have a strong tendency to knit together like entangled yarn. While the primary example of the present invention is related to discharging shredded tire pieces, other applications, such as woodchips, reinforced plastics and scrap may also be applicable.

In the discharging of shredded tire material to feed a tire liquefaction process, as described and disclosed in U.S. patent application Ser. No. 08/053,727 filed Apr. 27, 1993, the shredded tire material is contacted with oil at a temperature of 700° F. It is required, therefore, that the material be purge of oxygen prior to introduction into the liquefaction reactor. The present invention is for apparatus and method for doing that.

A chamber 3 with a top feed port 7 has support members 15 to give it greater strength. Located within chamber 3 are hanger bars 22 which are used to support a material drive system including a drive motor 27. A drive shaft 36, rotated by motor 27, is connected to a gear reducer 44. Gear reducer 44 also provides a 90° F. translation of the driving force to another drive shaft 52. Associated with drive shaft 52 is a bearing 56 mounted on a mounting plate 58 being held in place by support members 65. At the bottom of chamber 3 is an exit port 72.

Connected to drive shaft 52 is a screw auger 80. By way of example, screw auger 80, preferably turning at 20 revolutions per minute, might have a 10-inch diameter centered over a 16-inch outlet port 72. Arranged on either side of screw auger 80 are a pair of cylinders 88 having a plurality of lugs 96 mounted in a predetermined manner thereon. It should be noted that the bottom of chamber 3 is curved so as not to create any dead space between the lugs 96 on cylinder 88 and the bottom of chamber 3. Motor drive means for rotating cylinders 88 on axles 104 are not shown but their location would be obvious to one skilled in the art. The rotations of cylinders 88 may be any one of a combination of three movements with both cylinders 88 being rotated counterclockwise or having one cylinder being rotated clockwise and the other cylinder being rotated counterclockwise. Cylinder 88 may be rotated at a rotational speed that may be from 1/10th to ½ the speed of screw auger 80.

Also shown in FIG. 1 is feed valve means 120 and discharge valve means 125. These are simply conventional style gate valves that will allow the feed to enter chamber 3 and allow the feed material to exit chamber 3. Also shown in a simplified box diagram format, is a source of nitrogen 135 which provides purging nitrogen to chamber 3 through a line 140 including a valve 148.

As shown, the system of the present invention contemplates batch feeding of a tire liquefaction processing apparatus by having the interlocking solid material, namely the shredded tires, enter through valve means 120 which is then closed. In the meantime, discharge valve means 125 being closed prevents any of the shredded tires from entering the processing apparatus.

With both valve means 120 and 125 closed, valve 148 is open to allow nitrogen to enter chamber 3 to purge the oxygen that has entered with the tires. After the oxygen level has dropped to a suitable level, valve 148 is closed, discharge valve 125 is opened, and motor 27 is energized causing the screw auger 80 to rotate driving the shredded tire material out of bin 3. However, as happens in many cases, the shredded tire will bind because of its interlocking nature. Screw auger 80 then has a tendency to tunnel through the bound material around the screw auger 80. When binding occurs, only the tire material within the range of screw auger 80 would be moved. It is at this junction that the operations of cylinders 88 by their motor drive means keep the tire material in motion so that the tire material is fed to auger screw 80, thus preventing the tunneling effect.

Upon removal of the shredded tire material from bin 3, discharge valve means 125 may be closed and the system shut down until the next batch is ready to be processed.

What is claimed is:

1. A purge chamber, comprising:
   a chamber means for holding interlocking, solid material;
   an entrance port means connected to said chamber means for passing said interlocking, solid material into said chamber means;
   purge means connected to said chamber means for providing a purging gas to said chamber means;
   an exit port means connected to said chamber means for passing the interlocking, solid material from the chamber means;

an auger screw means mounted in said chamber for moving the interlocking, solid material from within the chamber means into the exit port means when rotated; and means for rotating said auger screw means.

2. The purge chamber of claim 1, wherein said exit port means includes an opening larger than the width or diameter of said auger screw means.

3. The purge chamber of claim 2, additionally comprising a rotatable lug defining means for breaking up said interlocking, solid material so as to prevent binding of said interlocking, solid material around said auger screw means, said lug rotating about an axis substantially perpendicular to the longitudinal axis of said auger screw means.

4. The purge chamber of claim 3, wherein said longitudinal axis of said auger screw means is substantially vertical.

5. The purge chamber of claim 4, additionally comprising a rotatable cylinder rotating about an axis substantially perpendicular to said longitudinal auger screw means axis, wherein said lug is secured to said cylinder.

6. The purge chamber of claim 4, comprising a pair of rotatable cylinders, and wherein each of said cylinders includes a plurality of said lugs.

7. The purge chamber of claim 6, wherein the axis of rotation of each rotatable cylinder is substantially parallel to the axis of rotation of the other rotatable cylinder.

8. The purge chamber of claim 7, wherein said rotatable cylinders are located adjacent the bottom end of said auger screw means.

9. The purge chamber of claim 8, wherein said auger screw means rotates at about 20 revolutions per minute.

10. The purge chamber of claim 8, wherein each rotatable cylinder rotates at a rotational speed of about $1/10$ to about $1/2$ of the rotational speed of said auger screw means.

11. The purge chamber of claim 8, wherein said rotatable cylinders rotate in the same rotational direction.

12. The purge chamber of claim 8, wherein said rotatable cylinders rotate in the opposite rotational direction.

* * * * *